(12) United States Patent
Dobrachinski

(10) Patent No.: US 8,540,273 B2
(45) Date of Patent: Sep. 24, 2013

(54) SHOPPING CART DESIGNED FOR VEHICLE TRUNKS

(76) Inventor: Gleid Elaine Dobrachinski, Itajai (BR)

( * ) Notice: Subject to any disclaimer, the term of this patent is extended or adjusted under 35 U.S.C. 154(b) by 342 days.

(21) Appl. No.: 12/870,034

(22) Filed: Aug. 27, 2010

(65) Prior Publication Data

US 2010/0320732 A1 Dec. 23, 2010

(51) Int. Cl.
*B62B 3/02* (2006.01)
(52) U.S. Cl.
CPC ..................................... *B62B 3/02* (2013.01)
USPC .................. 280/651; 280/641; 280/47.34
(58) Field of Classification Search
CPC ........................................................ B62B 3/02
USPC ................ 280/30, 47.34, 47.35, 79.11, 638, 280/639, 640, 651
See application file for complete search history.

(56) References Cited

U.S. PATENT DOCUMENTS

| | | | | |
|---|---|---|---|---|
| 2,953,287 A * | 9/1960 | Werner | ........................... | 224/496 |
| 3,082,016 A * | 3/1963 | Pratt | ............................. | 280/641 |
| 3,498,628 A * | 3/1970 | Ferneau et al. | ............... | 280/641 |
| 3,669,031 A * | 6/1972 | Cole | ............................... | 108/102 |
| 4,192,541 A * | 3/1980 | Ferneau | ......................... | 296/20 |
| 4,251,178 A * | 2/1981 | Bourgraf et al. | .............. | 414/343 |
| 4,953,878 A * | 9/1990 | Sbragia | ........................... | 280/30 |
| 5,084,922 A * | 2/1992 | Louit | ............................... | 5/86.1 |
| 5,503,424 A * | 4/1996 | Agopian | ........................ | 280/651 |
| 5,538,386 A * | 7/1996 | Scheibel | ........................ | 414/467 |
| 5,570,988 A * | 11/1996 | Gallaway et al. | ............. | 414/498 |
| 6,024,527 A * | 2/2000 | Soriano | .......................... | 414/345 |
| 6,045,150 A * | 4/2000 | Al-Toukhi | ..................... | 280/641 |
| 6,070,899 A * | 6/2000 | Gines | ............................. | 280/651 |
| 6,152,462 A * | 11/2000 | Barrett | ............................ | 280/30 |
| 6,575,491 B2 * | 6/2003 | Miller | ............................ | 280/638 |
| 6,976,696 B2 * | 12/2005 | O'Krangley et al. | ......... | 280/640 |
| 7,044,496 B2 * | 5/2006 | Holmes | ......................... | 280/639 |
| 7,080,844 B2 * | 7/2006 | Espejo | ..................... | 280/33.995 |
| 7,168,715 B1 * | 1/2007 | Friedman | .................... | 280/47.35 |
| 7,188,843 B2 * | 3/2007 | Magness | ......................... | 280/30 |
| 7,188,847 B1 * | 3/2007 | Friedman et al. | ........... | 280/47.35 |
| 7,229,093 B1 * | 6/2007 | Carter | ........................... | 280/651 |
| 7,306,245 B1 * | 12/2007 | Lowe | ........................... | 280/47.18 |
| 7,427,080 B2 * | 9/2008 | Naude et al. | .................. | 280/639 |
| 8,075,016 B2 * | 12/2011 | Silberberg | .................... | 280/641 |
| 8,083,253 B1 * | 12/2011 | Butler | ........................... | 280/651 |

(Continued)

FOREIGN PATENT DOCUMENTS

| | | | |
|---|---|---|---|
| DE | 10053997 A1 * | 5/2002 | |
| DE | 20313133 U1 * | 10/2003 | |
| FR | 2836445 A1 * | 8/2003 | |
| WO | WO 2007104071 A1 * | 9/2007 | |

*Primary Examiner* — John R Olszewski
*Assistant Examiner* — Jacob Meyer
(74) *Attorney, Agent, or Firm* — John Alumit

(57) ABSTRACT

A shopping cart which can be completely loaded inside a vehicle trunk and unloaded in the same way, without taking objects out of the basket at any time, is disclosed. The main purpose of this design is to facilitate the transport of groceries or other objects from a store to a vehicle and later to a final destination (e.g., pantry). The main parts of the invention comprises a basket with four or more wheels which are located on a structure with foldable legs, and a sliding support system that makes a track for the basket so it can slide completely inside vehicle trunks. This sliding system permits the cart structure and its legs to go inside a vehicle trunk, under the basket with groceries or any other objects.

4 Claims, 11 Drawing Sheets

(56) References Cited

U.S. PATENT DOCUMENTS

| | | | |
|---|---|---|---|
| 8,091,916 B2* | 1/2012 | Shapiro | 280/644 |
| 8,128,115 B2* | 3/2012 | Byrd | 280/480 |
| 8,172,256 B2* | 5/2012 | Fine | 280/651 |
| 2001/0052680 A1* | 12/2001 | Bennington | 280/30 |
| 2002/0149176 A1* | 10/2002 | Miller | 280/651 |
| 2005/0012286 A1* | 1/2005 | Woodrow | 280/47.35 |
| 2005/0140119 A1* | 6/2005 | Wong | 280/651 |
| 2005/0173878 A1* | 8/2005 | Espejo | 280/47.34 |
| 2006/0091625 A1* | 5/2006 | Naude et al. | 280/33.991 |
| 2007/0096437 A1* | 5/2007 | Watson | 280/651 |
| 2008/0093827 A1* | 4/2008 | Silberberg | 280/651 |
| 2010/0140887 A1* | 6/2010 | Yehiav et al. | 280/33.991 |
| 2010/0230934 A1* | 9/2010 | Fine | 280/651 |
| 2011/0049839 A1* | 3/2011 | Byrd | 280/480 |
| 2011/0156375 A1* | 6/2011 | Gal | 280/651 |
| 2011/0169235 A1* | 7/2011 | Moster | 280/30 |
| 2012/0193894 A1* | 8/2012 | Fine | 280/651 |

* cited by examiner

SHOPPING CART DESIGNED FOR VEHICLE TRUNKS

CROSS-REFERENCE TO RELATED APPLICATION

This application claims the benefit of the priority filing date in PCT/BR2009/000060, as amended and referenced in WIPO Publication WO/2009/109025 A1. The earliest priority date claimed is Mar. 5, 2008.

FEDERALLY SPONSORED RESEARCH

None

SEQUENCE LISTING OR PROGRAM

None

STATEMENT REGARDING COPYRIGHTED MATERIAL

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND

The present invention relates to a shopping cart, which can be used at home, supermarkets, streets, stores, and inside vehicles, making the transportation of objects directly into vehicle trunks easier without having to take objects out of the shopping cart. The shopping cart basket slides through a track system into a vehicle trunk. Shopping cart wheels are foldable within its structure, and it is designed to be easily loaded and transported inside a vehicle. The cart can be easily pulled out of the vehicle in the same way.

Known are foldable baskets which can be loaded into vehicles, but without the groceries. However, shopping carts or even grocery transport carts that may be placed inside vehicle trunks with groceries or objects inside them are not known, making the present invention novel.

Also known are several shopping cart accessories, such as electronic device installations, computer, clipboards, support for media, toys, scales, seat belts, motorized carts, baby seats, and many others. However none of these can load or unload the entire shopping cart structure inside a vehicle trunk filled with groceries or any other objects.

The present inventor has also filed another method to manufacture this shopping cart under [PI 0701416-3].

The present invention is also designed to permit shoppers to easily load and later unload their groceries, or any other objects, from vehicle trunks without taking them out of the transport cart basket. The cart basket may be foldable to facilitate its storage. The cart may be personally acquired by the shopper, presenting economic and space savings to supermarket chains. The development of this cart will also open a new market for sales of shopping carts.

The main purpose of this design is to facilitate the transport of groceries, or other items, from the store to the vehicle, and later from the vehicle to a storage place such as a pantry.

Other objects of the present invention will become better understood with reference to the appended Summary, Description and Claims.

SUMMARY

The Invention relates to shopping carts, in particular, a shopping cart which can be completely loaded inside the vehicle trunk and can be easily unloaded in the same way, without taking objects out of the basket at any time during transport. The main purpose of this design is to facilitate the transport of groceries or other objects from the store to the vehicle and later to the final destination (e.g., pantry). The main parts of the present patent consist of a basket with four or more wheels which are located on a structure with foldable legs, and a sliding support system that makes a track for the basket so it can slides completely inside vehicle trunks. This sliding system permits the cart structure and its legs to go inside the vehicle trunk, under the basket with groceries or any other objects.

DRAWINGS

DETAILED DESCRIPTION

Figure 1:
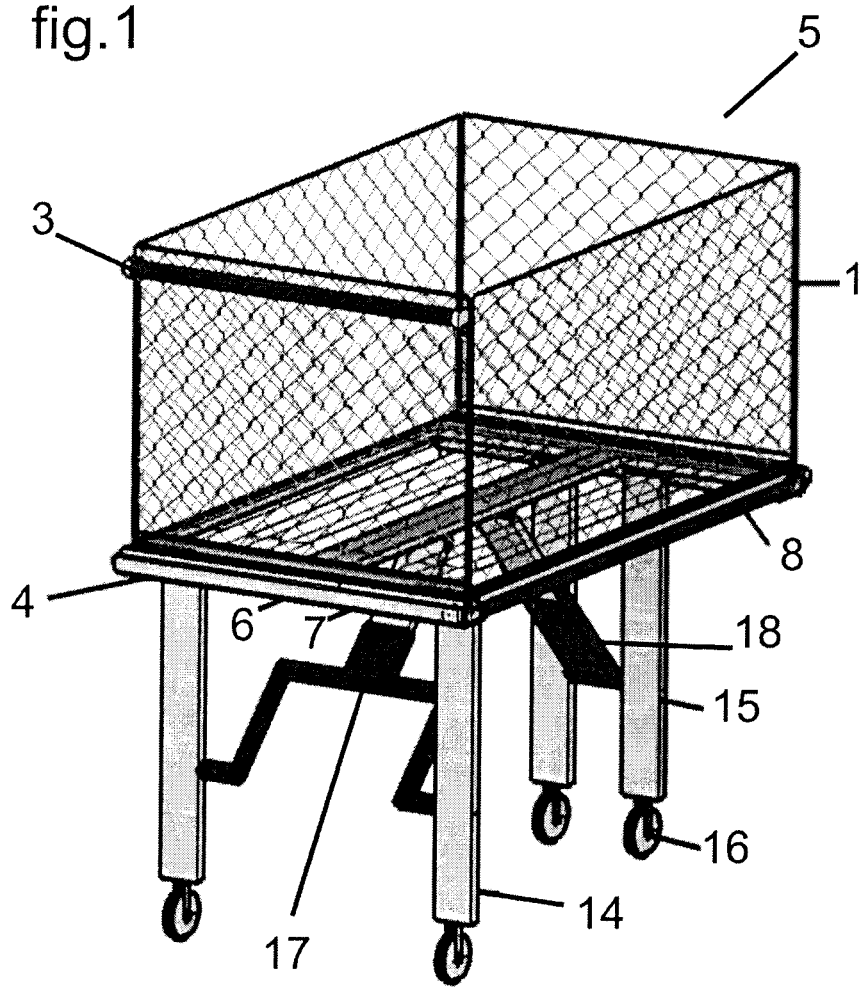
FIG. 1 illustrates the cart (5) and basket (1) ready to be used.
Figure 2:
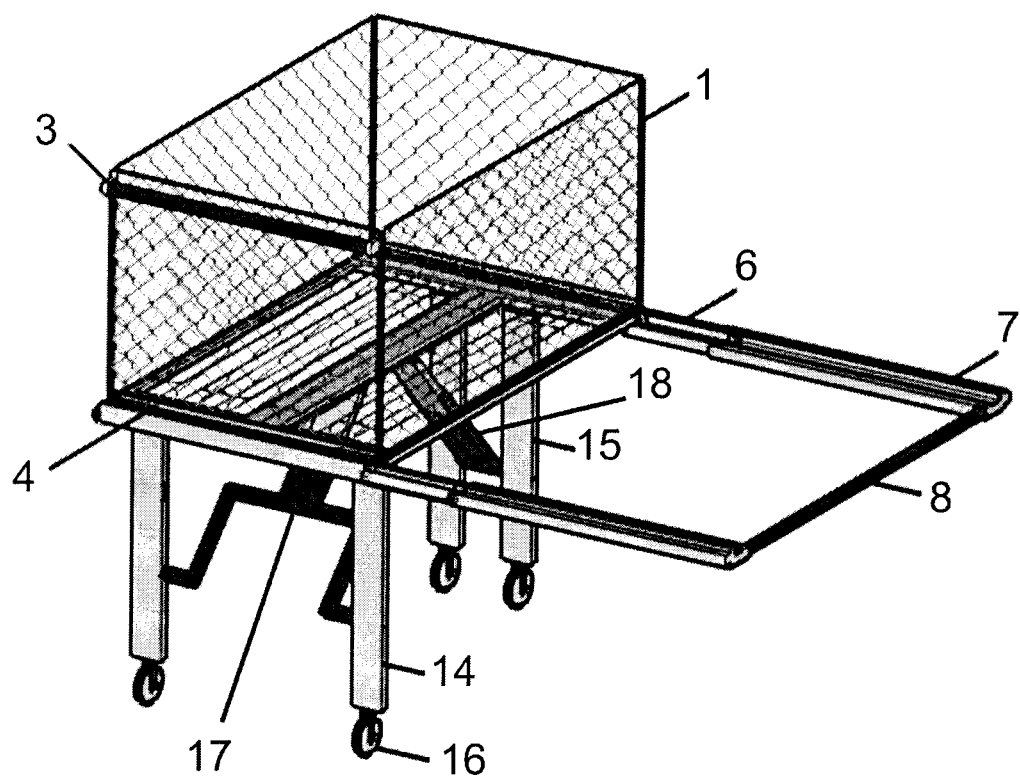
FIG. 2 shows the cart (5) and basket (1) parked with intermediate sliding supports (6) and external sliding supports (7) extended into an open vehicle trunk.
Figure 3:
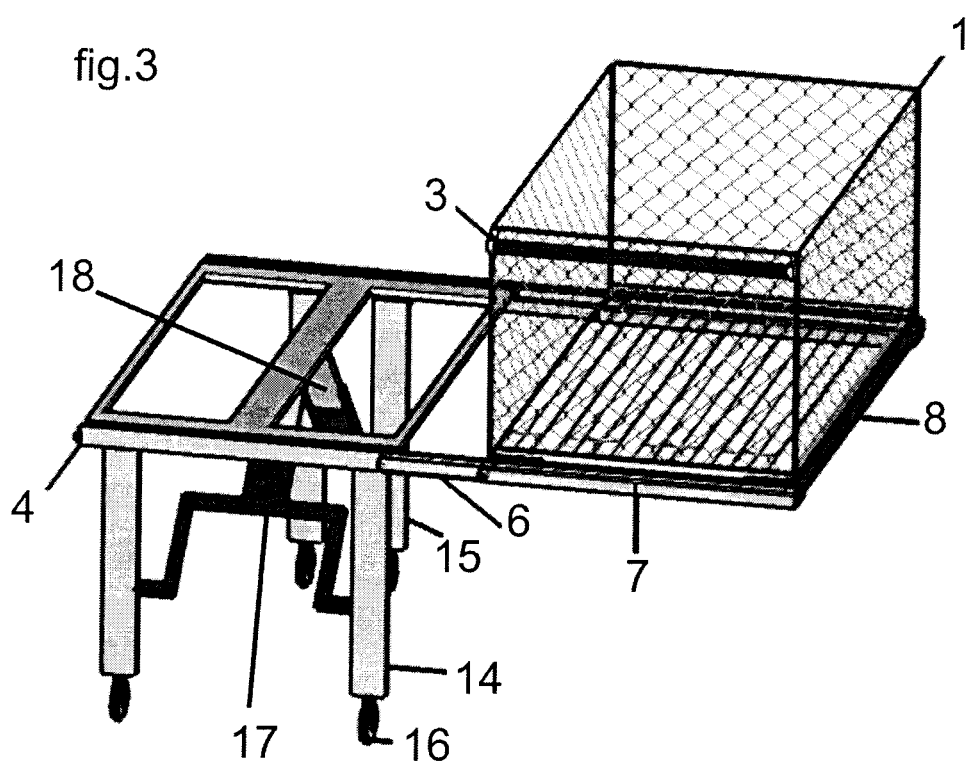
FIG. 3 shows the basket (1) inside the vehicle trunk after sliding through the structure sliding supports (4), the intermediate sliding supports (6) and the external sliding supports (7)
Figure 4:
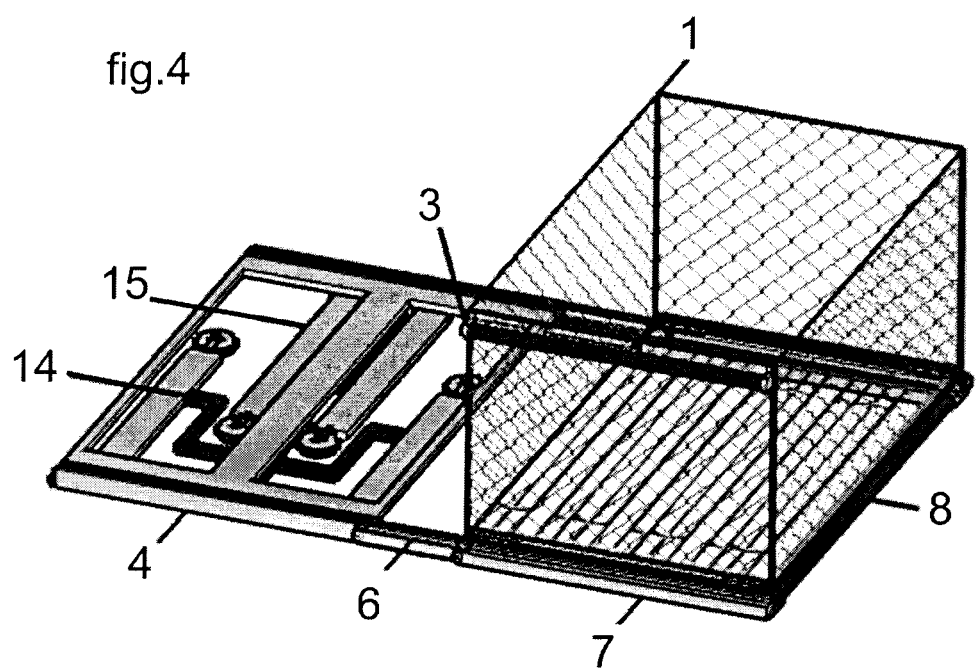
FIG. 4 illustrates the legs (14 and 15) of the cart being folded inside the structure sliding supports (4)
Figure 5:
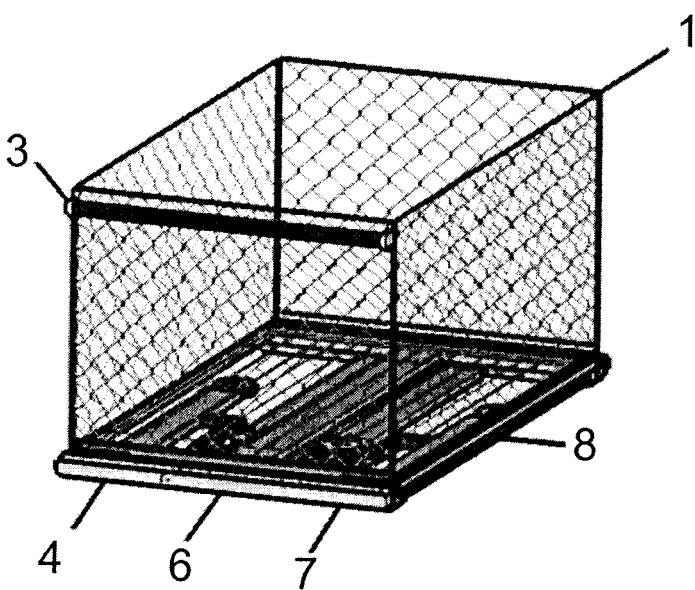
FIG. 5 illustrates the cart (5) loaded inside the vehicle trunk.
Figure 6:
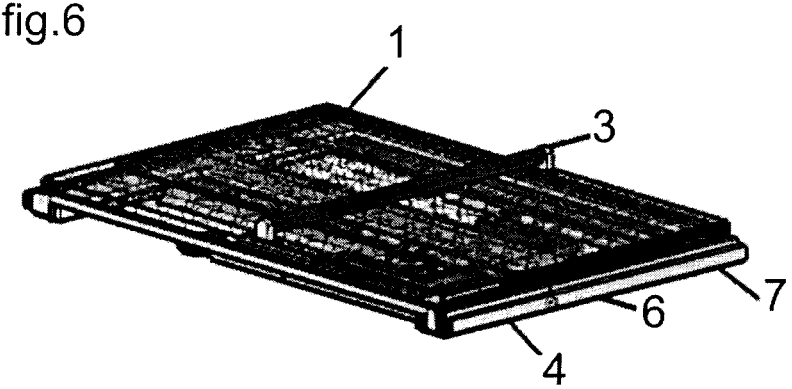
FIG. 6 illustrates the cart (5) with the basket (1) folded to facilitate its storage.
Figure 7:
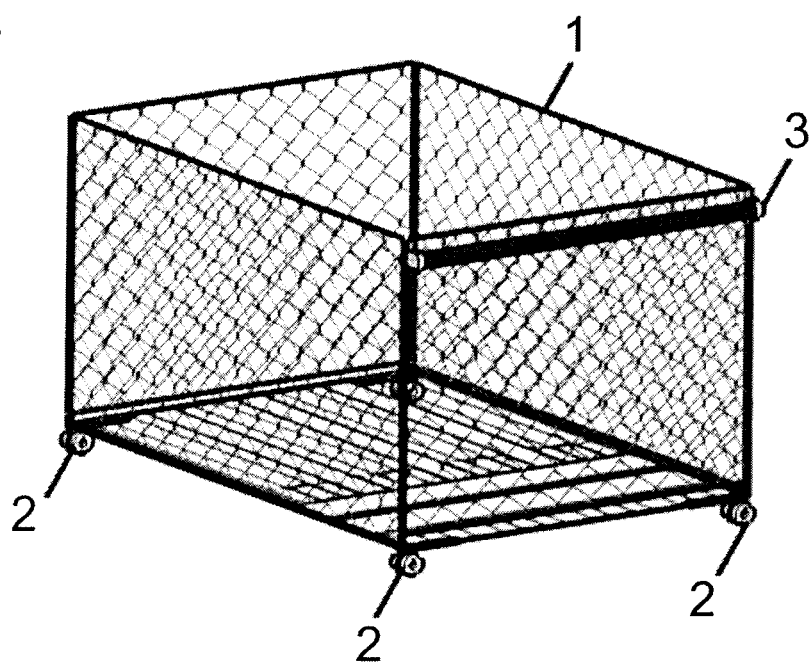
FIG. 7 shows a drawing of the basket (1)
Figure 8:
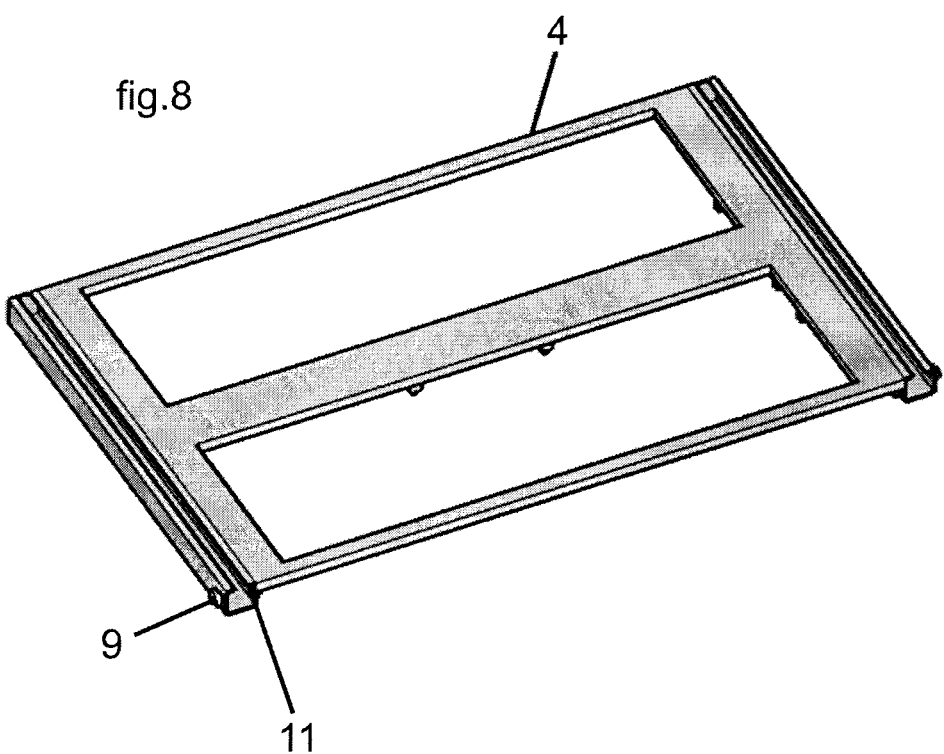
FIG. 8 shows a drawing of the structure sliding supports (4).
Figure 9:
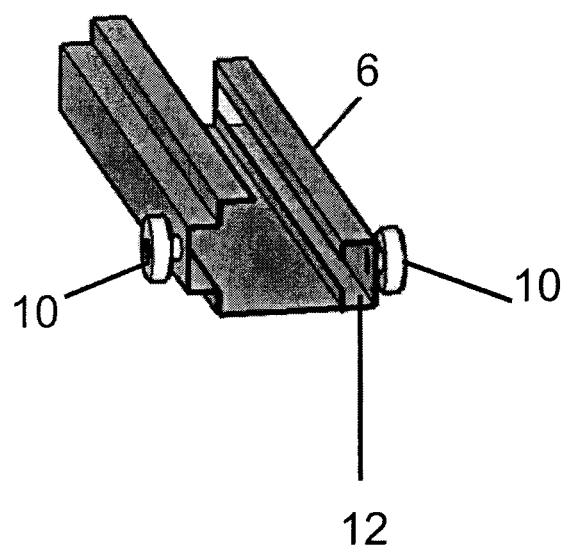
FIG. 9 shows a drawing of the intermediate sliding supports (6)
Figure 10:
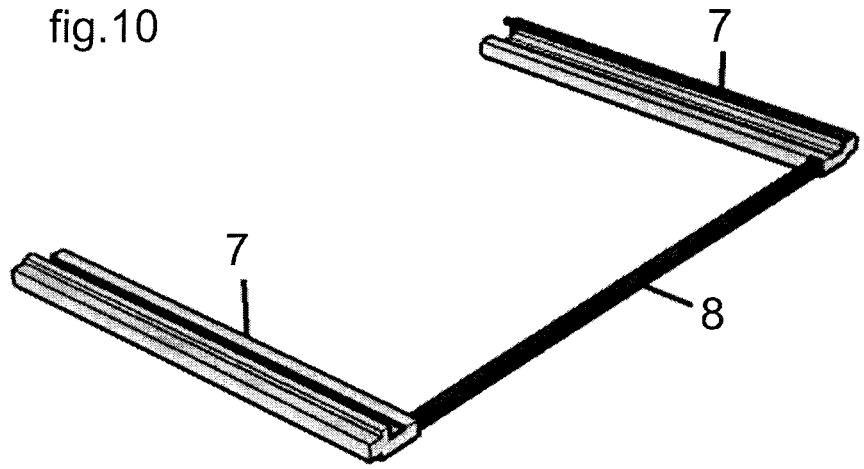
FIG. 10 shows a drawing of the external sliding supports (7) with a bar joint system (8)
Figure 11:
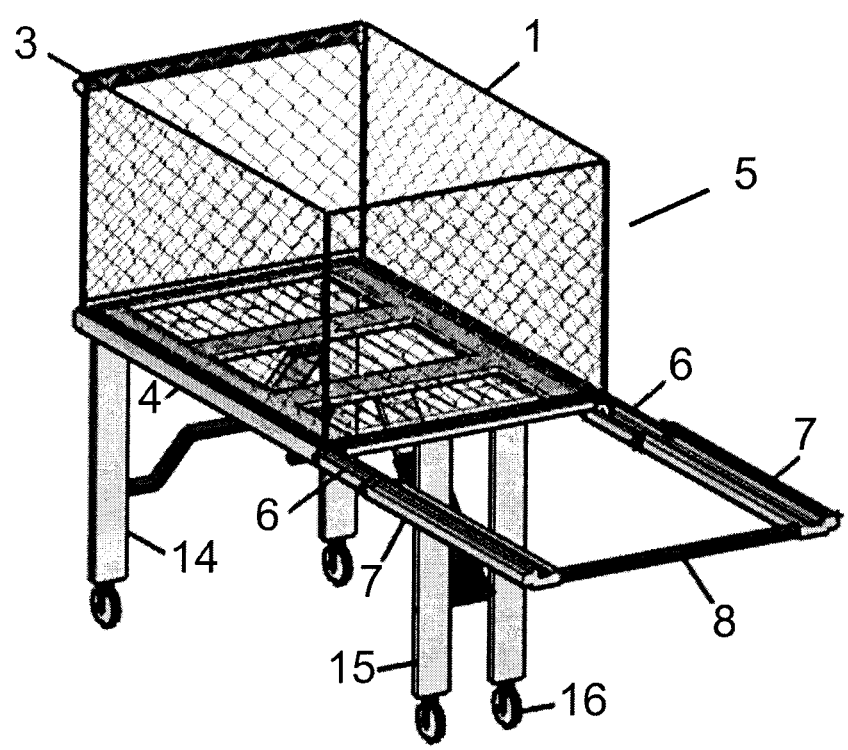
FIG. 11 shows a drawing of the same cart (5) with the sliding support system installed sideways and not in the rear and front position as shown in the previous drawings, as the cart can be installed both ways, according to the preferred vehicle model.

According to the drawings described above, the shopping cart designed for vehicle trunks, comprises a basket (1) with four or more casters (2) and a handle (3) incorporated to one of the basket (1) faces. The casters (2) rotate inside the retractable sliding support system made up by the structure sliding supports (4), intermediate sliding supports (6) and external sliding supports (7) of the cart (5). The external sliding supports (7) are linked by a bar (8). The intermediate sliding supports (6), having a profile which is slightly wider than the structure sliding supports (4), are fitted to and slide through the outside of the structure sliding supports. The external sliding supports (7), also having a profile slightly wider than the intermediate sliding supports (6), so as to enable the basket (1) to go all the way into the vehicle trunk. This sliding support system may or may not be provided with casters (9 and 10) or drawers (11, 12) in its inside and/or outside for better sliding. The structure sliding supports (4) of the cart (5) are formed by pairs of foldable outer legs (14) and pairs of inner legs (15) so that they can fit into the frame made up by the structure sliding supports (4); wheels (16) and pivot arms (17) and (18) being shaped to interconnect the structure sliding supports (4) with the outer legs (14) and inner legs (15). The basket (1) can be collapsible—see FIG. 6—to be folded up. The cart structure sliding supports (4) can be provided with integral sliding supports in the front part (not illustrated, but using the same art described hereunder) and in the rear part—attached Figures, as well as integral sliding supports on the sides (not illustrated, but using the same art described hereunder), according to the preferred vehicle model. Furthermore, sliding support system (4, 6 and 7) and legs (14 and 15) of the cart (5) can be folded up to facilitate the cart's storage and enable it to be transported as a handbag—see FIG. 6; the sliding support system (4, 6 and 7) and the basket (1) being on one side of the handbag cover and the legs (14 and 15) making up the handbag's other cover.

The external sliding supports (7) slide outside the intermediate sliding supports (6) and the intermediate sliding supports (6), in their turn, slide outside the structure sliding supports (4). The basket (1) slides through the sliding support system (4, 6 and 7) of the cart (5) and then, pivot arms (17) and (18) retract so that the pairs of outer legs (14) and inner legs (15) are folded up and arranged inside the frame made up by the structure sliding supports (4). Finally, the sliding support system made up by the structure sliding supports (4) and the pairs of outer legs (14) and inner legs (15) slides inside the intermediate sliding supports (6) and, along with those, slide inside the external sliding supports (7).

This sliding support system may or may not have wheels to draw the cart, and the wheels can be internal or external for better sliding. On the cart structure (1) foldable legs (5) (6) are installed to fit inside the designed object. The basket (4) can be foldable in many ways. The structure (1) can have sliding supports in the front part of the cart or in the rear. In addition, it can have sliding supports on the sides, adapting itself to the vehicle or other purpose. If the structure is split horizontally in the middle it can be used as a handbag to facilitate its storage.

The invention claimed is as follows:

1. A shopping cart designed for vehicle trunks comprised of a basket provided with four or more casters and a handle integral with a cart, comprising a retractable sliding support system which enables the basket and the cart to go all the way into a vehicle trunk, characterized in that the casters on the basket slide inside the retractable sliding support system made up by structure sliding supports, intermediate sliding supports and external sliding supports, thus enabling the basket to go all the way into a vehicle trunk when a pair of outer legs and inner legs are folded inside the structure sliding supports, wherein
    the structure sliding supports are fitted to and slide through the intermediate sliding supports and the intermediate sliding supports, in their turn, are fitted to and slide through the external sliding supports;
    the structure sliding supports are formed by foldable outer legs and inner legs so that they can fit into a frame made up by the structure sliding supports;
    wheels and pivot arms are shaped to interconnect the structure sliding supports; and
    external sliding supports are linked by a bar.

2. The shopping cart designed for vehicle trunks according to claim 1, characterized in that the structure sliding supports, intermediate sliding supports, and external sliding supports are provided with casters or drawers.

3. The shopping cart designed for vehicle trunks according to claim 1, characterized in that the sliding support system and the legs of the cart can be folded up to facilitate the cart's storage and enable it to be transported as a handbag; the sliding support system and basket being one side of the handbag cover and the legs of the cart making up the handbag's other cover.

4. The shopping cart designed for vehicle trunks according to claim 1, characterized in that the external sliding supports slide outside the intermediate sliding supports and the intermediate sliding supports, in their turn, slide outside the structure sliding supports and the basket slides through the sliding support system;
    the pivot arms retract so that the pair of outer legs and inner legs are folded up and arranged inside the frame made up by the structure sliding supports; and
    the sliding support system, made up by the structure sliding supports and the pair of outer legs and inner legs slides, slides inside the intermediate sliding supports and, along with those, slide inside the external sliding support.

\* \* \* \* \*